United States Patent [19]
Sasaki et al.

[11] Patent Number: 5,505,173
[45] Date of Patent: Apr. 9, 1996

[54] SPARK IGNITION ENGINE WITH A FUEL INJECTOR FOR INJECTING FUEL DIRECTLY INTO THE CYLINDER

[75] Inventors: Shizuo Sasaki, Numazu; Takanori Ueda, Susono, both of Japan

[73] Assignee: Toyota Jidosha Kabushiki Kaisha, Toyota, Japan

[21] Appl. No.: 278,343

[22] Filed: Jul. 21, 1994

[30] Foreign Application Priority Data

Jul. 22, 1993 [JP] Japan ........................... 5-181662
Oct. 14, 1993 [JP] Japan ........................... 5-256954

[51] Int. Cl.⁶ ............................................. F02F 3/26
[52] U.S. Cl. ............................................. 123/276
[58] Field of Search ........................ 123/276, 305, 123/295, 263, 301

[56] References Cited

U.S. PATENT DOCUMENTS

| 4,522,173 | 6/1985 | Agachi ................... | 123/276 |
| 4,920,937 | 5/1990 | Sasaki et al. ........... | 123/305 |
| 5,170,759 | 12/1992 | Ito ....................... | 123/276 |

FOREIGN PATENT DOCUMENTS

| 488254 | 6/1992 | European Pat. Off. . | |
| 532020 | 3/1993 | European Pat. Off. . | |
| 494416 | 3/1992 | Japan ................. | 123/276 |
| 4187840 | 7/1992 | Japan ................. | 123/276 |
| 5-79370 | 3/1993 | Japan . | |
| 5-79337 | 3/1993 | Japan . | |
| 5-71350 | 3/1993 | Japan . | |

*Primary Examiner*—Raymond A. Nelli
*Attorney, Agent, or Firm*—Kenyon & Kenyon

[57] ABSTRACT

A spark ignition engine with a fuel injector for injecting fuel directly into the cylinder comprising a hollow combustion chamber formed on an upper surface of a piston, an ignition plug inserted into the vicinity of the side wall of the combustion chamber at an ignition timing by the movement of the piston, a fuel injector for injecting fuel toward the side wall of the combustion chamber in at least one predetermined engine driving condition, and at least one fuel guide passage for leading fuel injected by the fuel injector into the vicinity of the inserting position, in the combustion chamber, into which the ignition plug is inserted. The fuel guide passage passes through the vicinity of said inserting position. Each wall constructing the fuel guide passage and each extended phantom surface of each wall are arranged not to cross the ignition portion provided at the tip of the ignition plug in spite of the piston position.

14 Claims, 10 Drawing Sheets

SPARK IGNITION ENGINE WITH A FUEL INJECTOR FOR INJECTING FUEL DIRECTLY INTO THE CYLINDER

BACKGROUND OF THE INVENTION

1. Field of the Invention

The present invention relates to a spark ignition engine with a fuel injector for injecting fuel directly into the cylinder.

2. Description of the Related Art

Japanese Patent Application No. 4-41102 filed by the same applicant discloses an engine which comprises a hollow combustion chamber formed on an upper surface of the piston, a plug pocket for the ignition plug extending outwardly from the side wall of the combustion chamber, a L-shape step portion formed along a part of the circumference of the combustion chamber, the side wall of which contacts or crosses with the side wall of the plug pocket and a part of which is used as a first fuel guide passage, and a second fuel guide passage formed on the upper portion of the side wall of the combustion chamber so as to contact with the bottom wall of the step portion and leading to the plug pocket. In the above engine, fuel injected in the area from the second fuel guide passage to the bottom wall of the step portion at a low engine load, is directed to the plug pocket along the fuel guide passages while being evaporating by the heat of the piston. At this time, the evaporated fuel is prevented from flowing out the upper surface of the piston by the side wall of the step portion and is surely led into the plug pocket without passing the outside thereof. Thus, the above engine is intended to realize a good stratified charge combustion at a low engine load, by collecting all of injected fuel into the plug pocket as evaporated fuel.

In the above engine, all of injected fuel cannot evaporate until it reaches the plug pocket so that a part amount of injected fuel flows thereinto as liquid fuel. If the engine speed is so low that the time from fuel injection to ignition is relative long, all of the liquid fuel in the plug pocket can evaporate therein during this time and the above good stratified charge combustion can be realized. However, when the engine speed is high, the ignition plug can be inserted into the plug pocket before all of the liquid fuel evaporates. In this case, the liquid fuel can stick onto 10 the ignition portion of the plug so that misfires occur.

SUMMARY OF THE INVENTION

Therefore, an object of the present invention is to provide a spark ignition engine with a fuel injector for injecting fuel directly into the cylinder, capable of preventing misfires and realizing a good stratified charge combustion by using the hollow combustion chamber formed on the upper surface of the piston in at least a predetermined engine driving condition.

According to the present invention there is provided a spark ignition engine with a fuel injector for injecting fuel directly into the cylinder comprising: a hollow combustion chamber formed on an upper surface of a piston; an ignition plug inserted into the vicinity of the side wall of the combustion chamber at ignition time by virtue of the movement of said piston; a fuel injector for injecting fuel toward the side wall of the combustion chamber in at least a predetermined engine driving condition; and at least one fuel guide passage for leading fuel injected by the fuel injector into the vicinity of the inserting position in the combustion chamber into which the ignition plug is inserted, wherein the fuel guide passage passes through the vicinity of the inserting position, each wall constructing the fuel guide passage and each extended phantom surface of the each wall are arranged not to cross the ignition portion provided at the tip of the ignition plug in spite of the piston position.

The present invention will be more fully understood from the description of preferred embodiments of the invention set forth below, together with the accompanying drawings.

DESCRIPTION OF THE PREFERRED EMBODIMENTS

Figure 1:
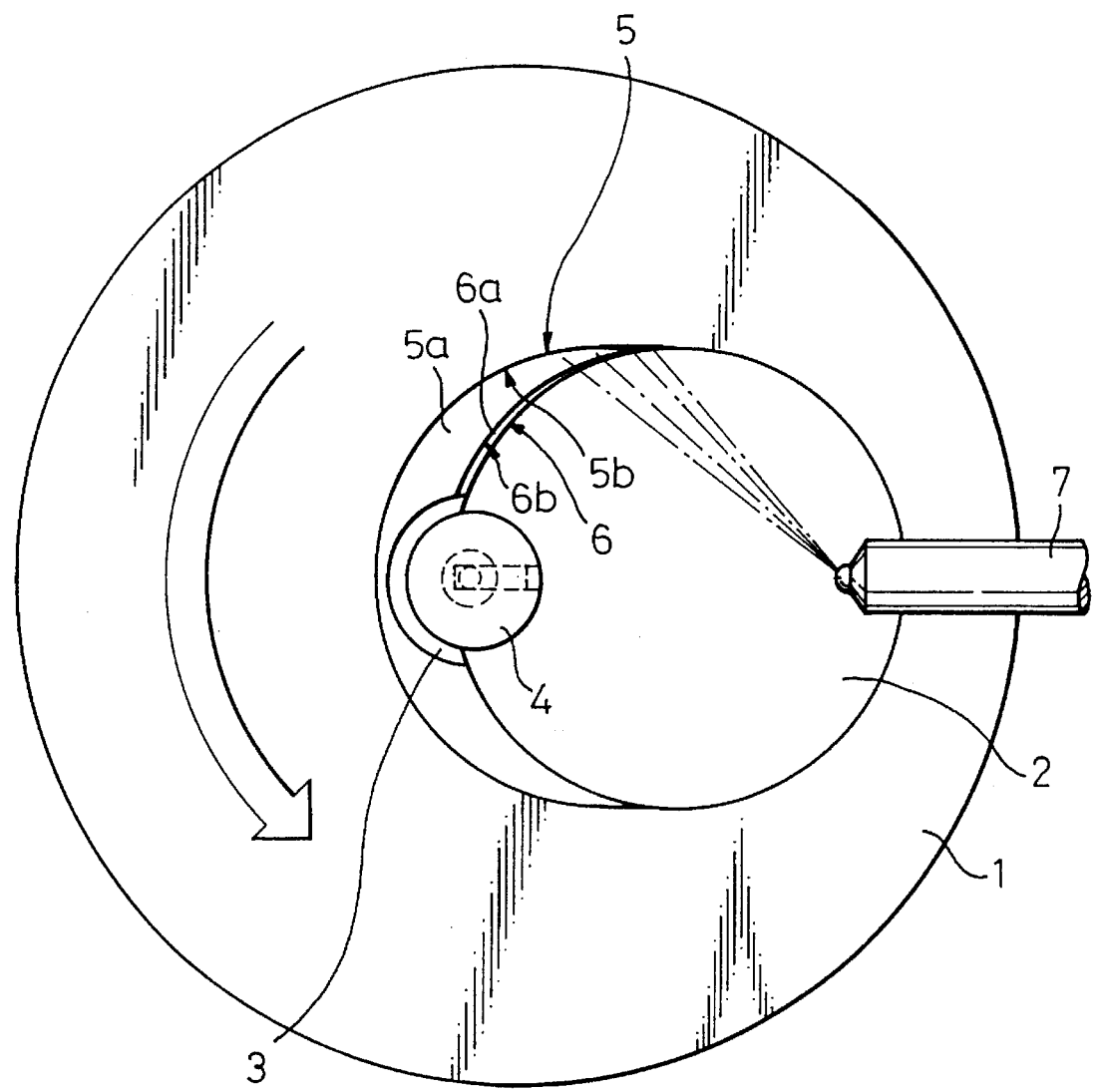
FIG. 1 is a plan view of a piston in an engine as a first embodiment of the present invention.
Figure 2:
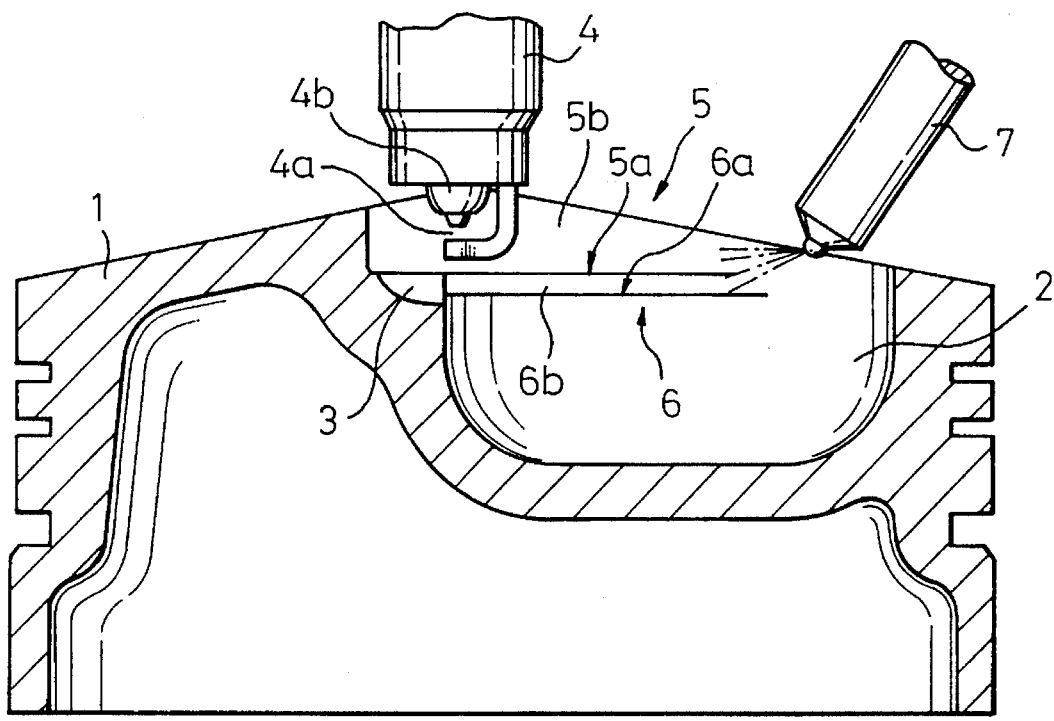
FIG. 2 is a vertical sectional view of FIG. 1.

Referring to FIGS. 1 and 2, reference numeral 1 designates a piston, upper surface of which is formed as a hollow combustion chamber 2. From an intake port (not shown), a swirl, as shown by the arrow, is created on the upper surface of the piston 1 and in the combustion chamber 2.

On a part of the side wall of the combustion chamber 2, an almost L-shaped first fuel guide passage 5 passing adjacent to a tip of an ignition plug 4 inserted into the combustion chamber 2 at ignition time, and an almost L-shaped second fuel guide passage 6 contacting with the bottom wall 5a of the first fuel guide passage 5, are formed. The bottom wall 5a and the side wall 5b constructing the first fuel guide passage 5 are spaced slightly away from the tip of the ignition plug 4 inserted into the combustion chamber 2 at ignition time and, especially on the bottom wall 5a, a partly globular recess 3 is formed just under the ignition plug 4 to prevent a collision caused by a dimensional tolerance therebetween. The bottom wall 5a is arranged not to cross an ignition portion of the ignition plug 4, i.e., an insulated portion 4b and an ignition gap 4a, to take account of dimensional tolerance.

Reference numeral 7 designates a fuel injector having first and second injection holes. The fuel injecting direction of the first injection hole is set so as that in the latter half of a compression stroke, fuel injected impinges obliquely on the upper portion of the side wall 5b of the first fuel guide passage 5 at a swirl upstream end thereof from above, and after impinging, is given inertial force toward the inserting position which the ignition plug 4 is inserted into the combustion chamber 2 at ignition time. On the other hand, the fuel injecting direction of the second injection hole is set so as that fuel injected impinges on the upper portion of the side wall 6b of the second fuel guide passage 6 similarly.

Figure 6:
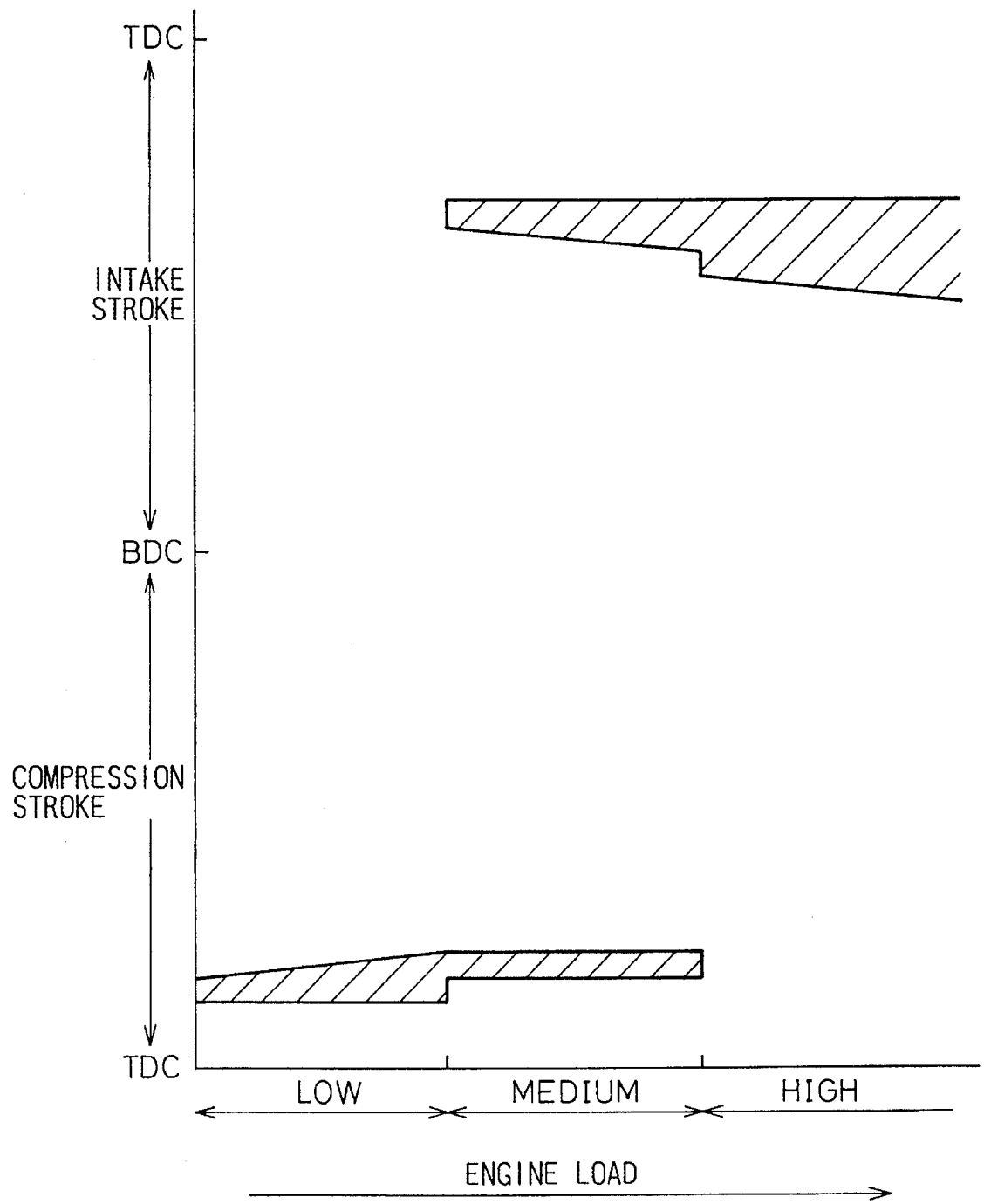
FIG. 6 shows a first map of fuel injection timings 30 under each engine load in the first embodiment.

In the above engine as the first embodiment of the present invention, fuel injection timing at each engine load is decided in accordance with a first map shown in FIG. 6. As seen from the first map, fuel injection in low engine load driving conditions is carried out in the latter half of a compression stroke. In this fuel injection, at first, the fuel injected from the first injection hole impinges on the first fuel guide passage 5 and is given three inertial forces, i.e., the first inertial force toward the inserting position of the ignition plug 4, the second inertial force D1 toward the about center of the combustion chamber 2, and the third inertial force D2 toward upper part of the combustion chamber. The first inertial force is made relatively small by selecting an adequate fuel impinging angle. Then, by the continuation of the fuel injection, the fuel is supplied to the second fuel guide passage 6 similarly. On the other hand, the fuel injected from the second injection hole is supplied to the area from the upper portion of the side wall 6b of the second fuel guide passage 6 to the side wall of the combustion chamber 2. Thus, the fuel injected from the fuel injector 7 is mainly supplied to the first and second fuel guide passages 5, 6 and the remainder is supplied to the combustion chamber 2.

Figure 3A:
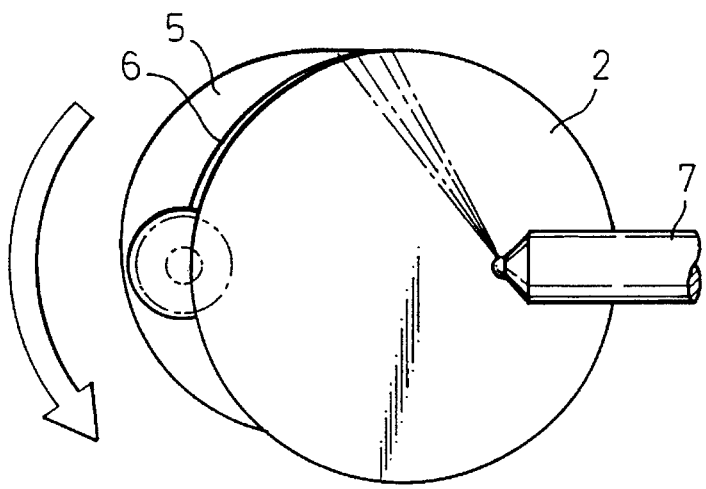
FIG. 3(A) is a plan view of the piston of FIG. 1 showing a fuel distribution condition at a fuel injection timing in a low engine speed driving condition.
Figure 3B:
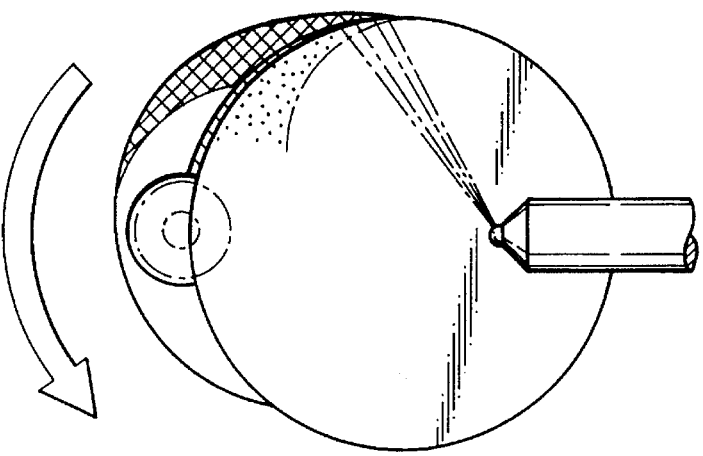
FIG. 3(B) is a plan view of the piston of FIG. 1 showing a fuel distribution condition between the fuel injection timing and an ignition timing in a low engine speed driving condition.

The fuel supplied to the combustion chamber 2 evaporates and becomes a lean air-fuel mixture under the effect of the swirl therein, as shown by the dots in FIG. 3(B). On the other hand, as shown by the cross hatch area in FIG. 3(B), the fuel supplied to both of the fuel guide passages 5, 6 mainly progresses toward the inserting position of the ignition plug 4 while gradually spreading toward the sectional directions (D1 and D2) of the two fuel guide passages 5, 6 under the influence of the above three inertial forces, as liquid fuel. Some of the liquid fuel evaporates due to heat of the piston 1, but the remainder spreads as liquid 5 toward the sectional directions of the two fuel guide passages 5, 6 and reaches the vicinity of the inserting position of the ignition plug 4.

Figure 3C:
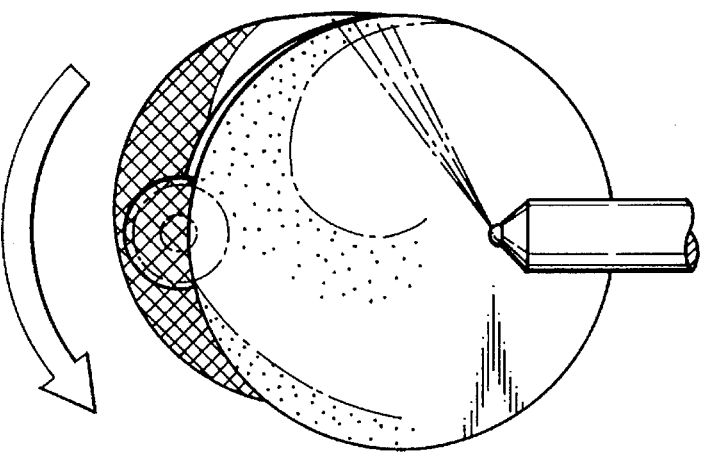
FIG. 3(C) is a plan view of the piston of FIG. 1 showing a fuel distribution condition at the ignition timing in a low engine speed driving condition.
Figure 4:
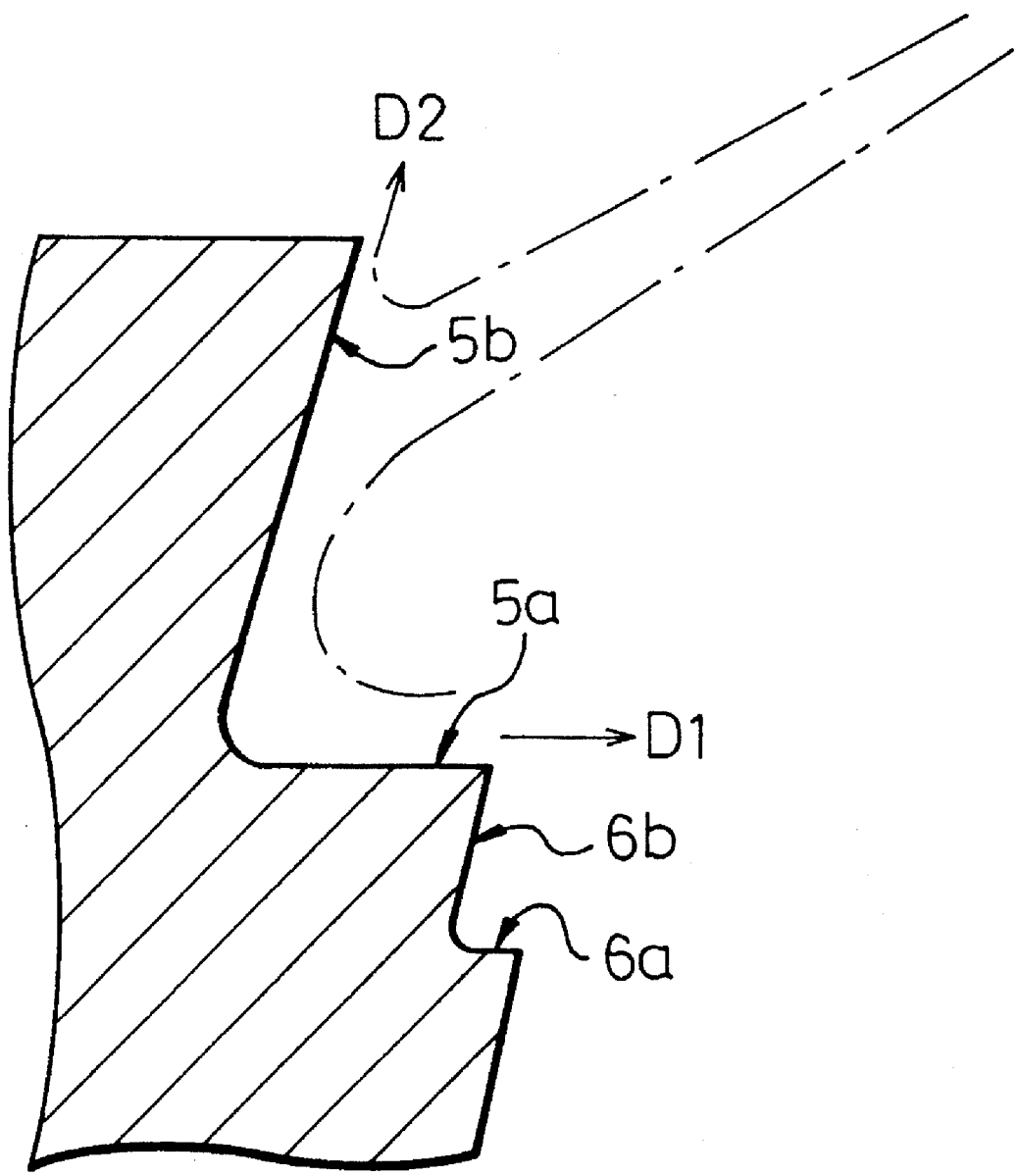
FIG. 4 is an enlarged vertical sectional view of a portion on which injected fuel impinges in a first fuel guide passage of FIG. 1.

At this time, if the engine speed is relatively low, the ignition plug 4 does not yet reach into the combustion chamber 2, so that the liquid fuel mainly passes through the vicinity of the inserting position of the ignition plug 4 under the influence of the inertial forces while evaporating, as shown in FIG. 3(C). The liquid fuel at the swirl downstream end of the fuel guide passages 5, 6 diffuses there at and thereafter evaporates. Note that when the fuel evaporates, the inertial forces of the fuel weaken rapidly. Therefore, the fuel evaporated at the swirl upstream sides of the first and second fuel passages 5, 6 beyond the inserting position of the ignition plug 4 moves slowly with a swirl which has a relative low speed, so that at the ignition timing the relative rich mixture remains on the first and second fuel guide passages 5, 6 including the vicinity of the inserting position of the ignition plug 4. Therefore, once ignition is carried out by the ignition plug 4, the mixture in the first and second fuel guide passages 5, 6 is ignited and properly burned and the flame propagates to the lean mixture in the combustion chamber 2 and the lean mixture burns favorably under the effect of the swirl so that good stratified charge combustion which realizes a low fuel consumption, can be obtained.

Figure 5:
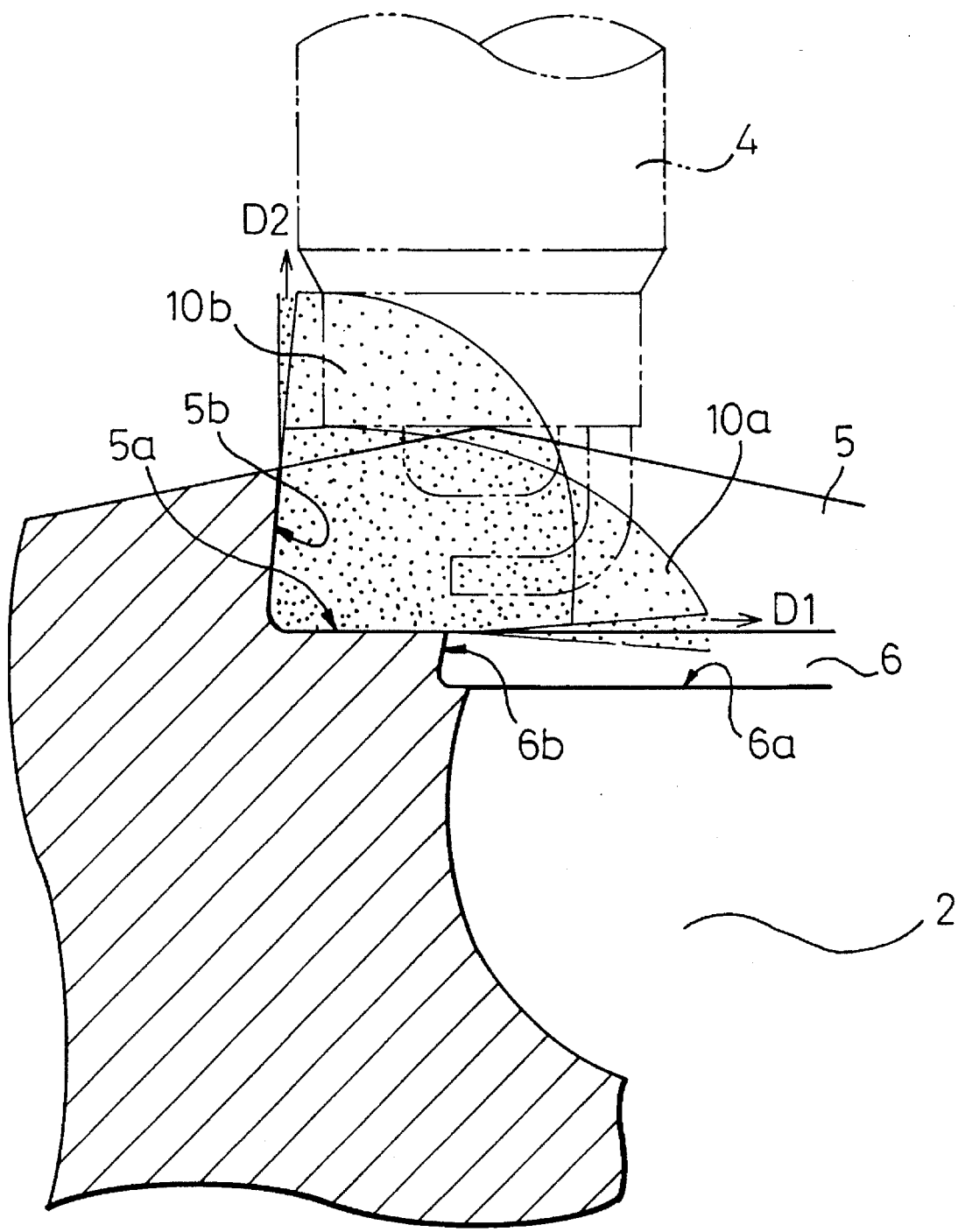
FIG. 5 is an enlarged vertical sectional view of the vicinity of the tip of the ignition plug at ignition time in a high engine speed driving condition of the first embodiment.

Once the engine speed becomes high and the time from the fuel injection timing to the ignition timing becomes relatively short, in the engine disclosed as the related art, ignition can be carried out when liquid fuel remains in the plug pocket. As a result, liquid fuel sticks to the insulated portion and the ignition gap arranged on the tip of the ignition plug so that a misfire can occur due to the liquid fuel sticking to the ignition gap and poor insulation of the ignition plug caused by fuel carbonization. However, in the first embodiment, the liquid fuel reaches the swirl downstream sides of the first and second fuel guide passages 5, 6 beyond the inserting position of the ignition plug 4. When the liquid fuel passes the inserting position of the ignition plug 4, the fuel moving on the first fuel guide passage 5 does not stick to the ignition plug 4 because the bottom wall 5a and the side wall 5b of the first fuel guide passage 5 and the phantom extending surface thereof are arranged not to cross the ignition plug 4, as shown in FIG. 5. On the other hand, in connection with the second fuel guide passage 6, the fuel can stick slightly to the ignition plug 4 by moving upward. However, the width of the bottom wall 6a is made smaller at the position where the injected fuel impinges, so that the upward inertial force given to the fuel is relative small and the amount of fuel sticking to the ignition plug 4 is small. Thus, the fuel does not stick to the ignition portion of the ignition plug 4, i.e., the insulated portion 4b and the ignition gap 4a, and at this time, the tip of the ignition plug 4 is surrounded by liquid fuel moving on the bottom wall 5a and the liquid fuel moving on the side wall 5b of the first fuel guide passage 5, and the rich mixture is formed in the vicinity of the ignition gap 4a of the ignition plug 4 in order that the vapor from the fuel moving in the D1 direction and the vapor from the fuel moving un the D2 direction are put together, as shown in FIG. 5. Therefore, in the low engine load and high engine speed driving conditions, good stratified charge combustion can be obtained, without misfire, similar to the low engine load and low engine speed driving conditions.

As seen from the first map, fuel injection in high engine load driving conditions is carried out during an intake stroke. Accordingly, a uniformly concentrated air-fuel mixture is formed in the whole combustion chamber 2 to make use of very long time from the fuel injection timing to the ignition timing and thus the uniform mixture combustion which can obtain high torque is realized by use of the swirl created therein. As seen from the first map, in medium engine load driving conditions, a certain amount of the fuel required is injected in the latter half of a compression stroke similar to the low engine load driving conditions and the remaining amount of the fuel required is injected during an intake stroke similar to the high engine load driving conditions. Therefore, a rich mixture which has good ignition ability is formed in the vicinity of the tip of the ignition plug 4 as mentioned above and the concentration of the mixture formed in the combustion chamber 2 is higher than in the low engine load driving conditions, so that stratified charge combustion which can obtain relative high torque, is realized.

In the idle condition and the like, i.e., very low engine load and very low engine speed conditions, the amount of fuel required is very small and the time from the fuel injection timing to the ignition timing becomes very long. Therefore, at ignition time, all of the rich mixture on the first fuel guide passage 5 can reach the downstream side beyond the inserting position of the ignition plug 4 with the swirl so that there can be no rich mixture in the vicinity of the tip of the ignition plug 4. However, in these driving conditions, the fuel supplied to the second fuel guide passage 6 later than to the first fuel guide passage 5 evaporates and gathers to the vicinity of the tip of the ignition plug 4, as a relative rich mixture, so that a good ignition ability can be retained. Note that if the fuel injection timing in the very low engine load and very low engine speed driving conditions is delayed more than in the normal low engine load and low engine speed driving conditions, the second fuel guide passage 6 may be omitted. Moreover, if the dimension between the ignition plug 4 and the bottom wall 5b of the first fuel guide passage 5 is enough large to prevent collision therebetween, the recess 3 may be omitted.

Figure 7A:
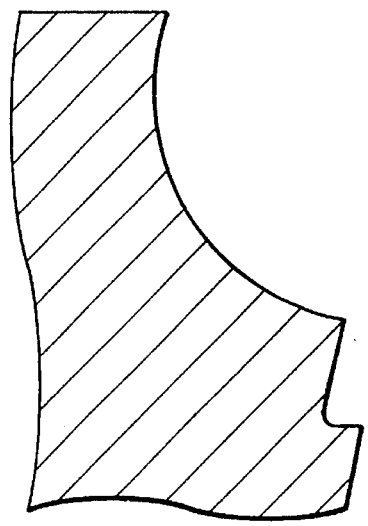
FIG. 7(A) shows a modification of a portion on which injected fuel impinges in a first fuel guide passage.
Figure 7B:
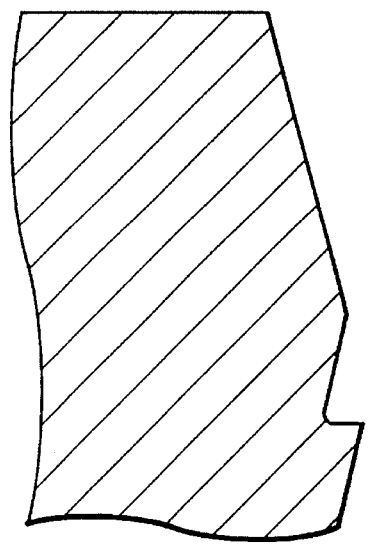
FIG. 7(B) shows another modification of a portion on which injected fuel impinges in a first fuel guide passage.
Figure 7C:
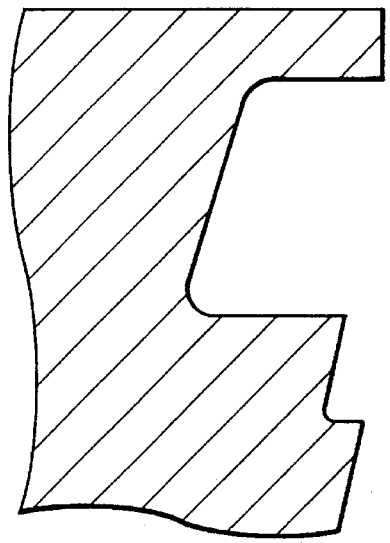
FIG. 7(C) shows another modification of a portion on which injected fuel impinges in a first fuel guide passage.

In the first embodiment, each of the first and second fuel guide passages 5, 6 has a L-shape section. However, any sectional shape by which the liquid fuel and vapor fuel is lead to the vicinity of the tip of the ignition plug 4, for example, arc-like shape, inclination shape, or U-shape etc. can be selected, as shown in FIGS. 7(A), 7(B), or 7(C).

Figure 8:
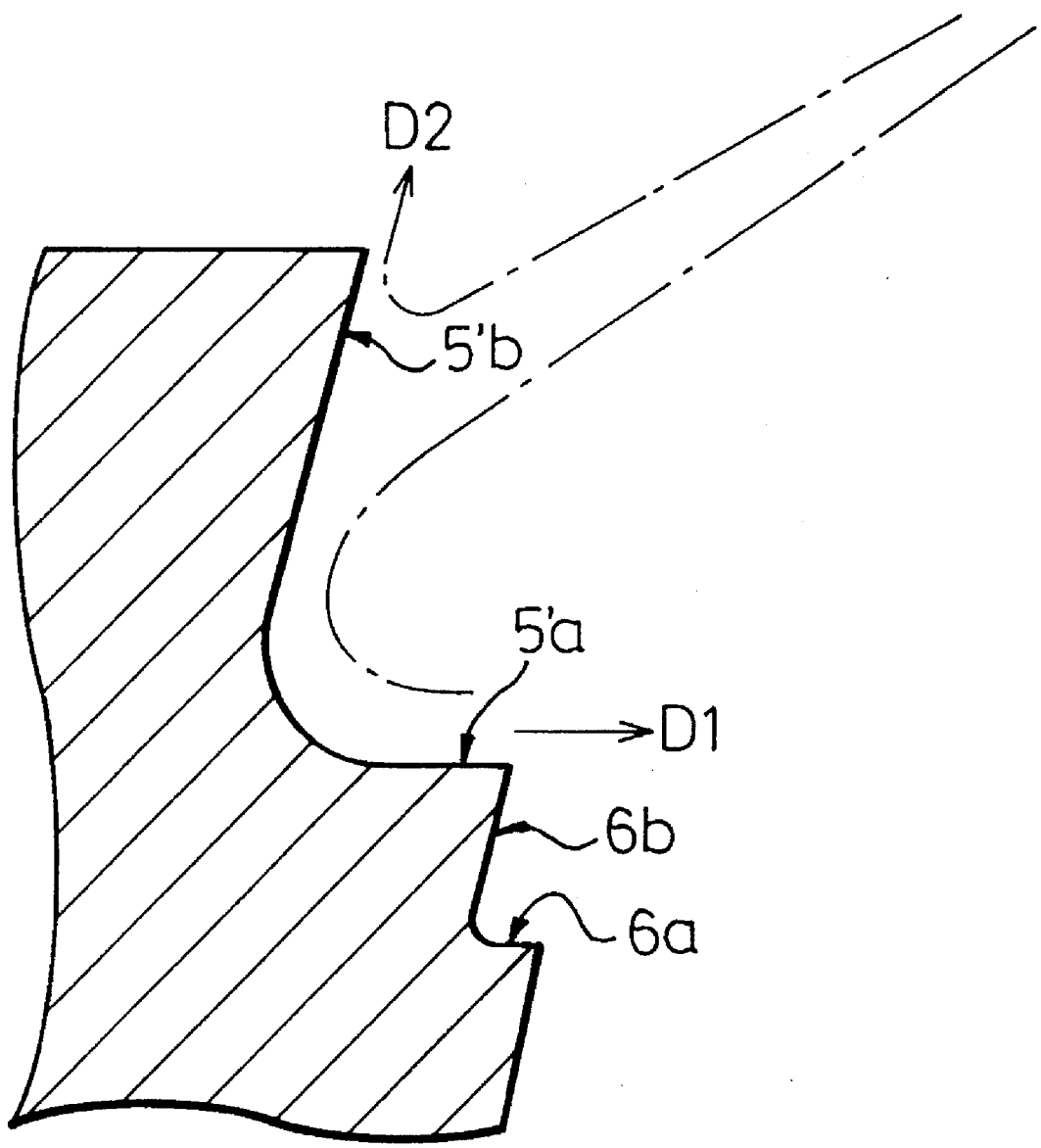
FIG. 8 is an enlarged vertical sectional view of a portion on which injected fuel impinges in a first fuel guide passage as a second embodiment of the present invention.
Figure 9:
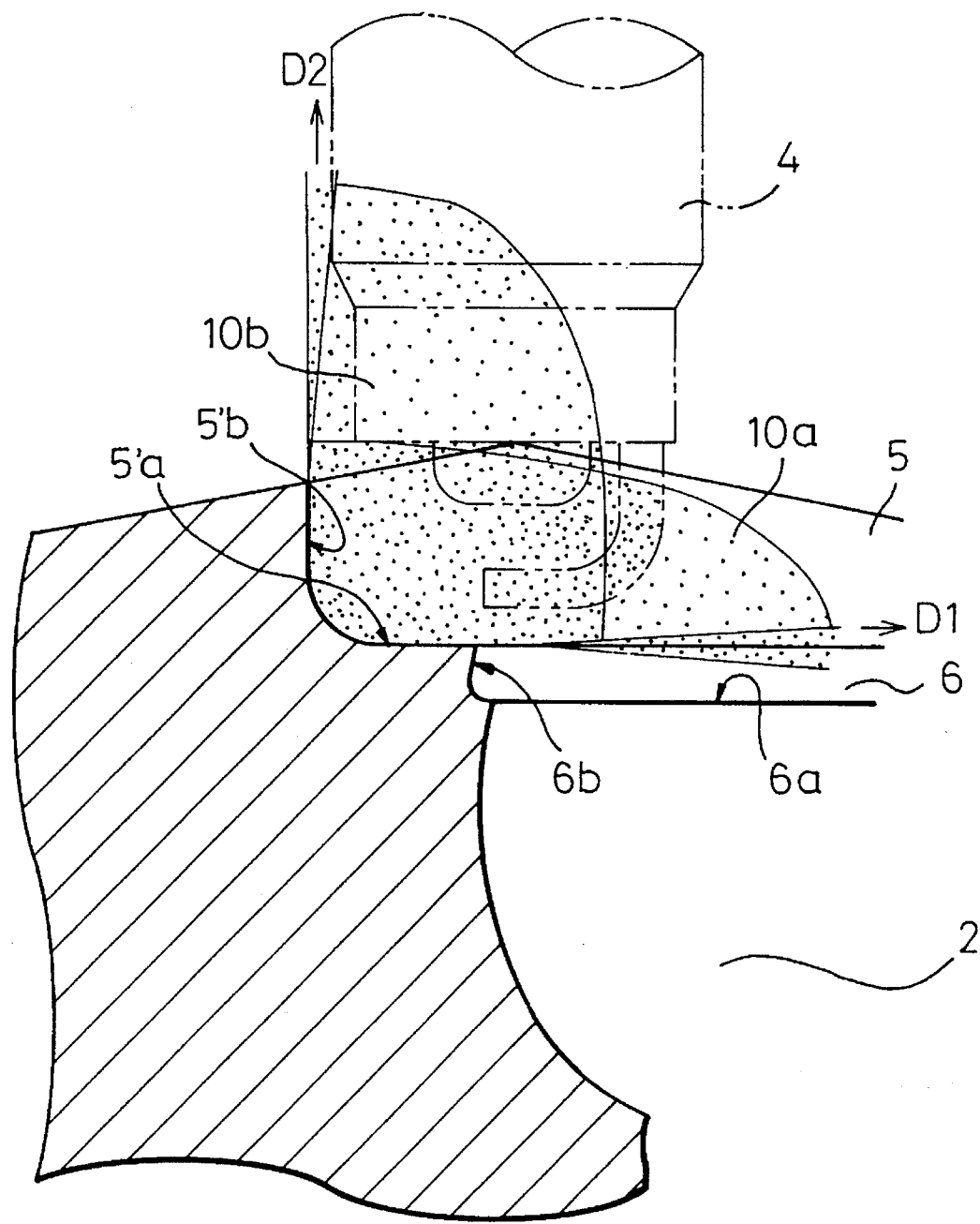
FIG. 9 is an enlarged vertical sectional view of the vicinity of the tip of the ignition plug at ignition time in high engine speed driving condition of the second embodiment.

A second embodiment of the present invention is shown in FIGS. 8 and 9. In these figures, the bottom wall 5'a and the side wall 5'b of the first fuel guide passage 5' are connected each other by an arc which has a large radius. Therefore, as shown in FIG. 8, when the fuel impinges the first fuel guide passage 5', the D1 direction inertial force and the D2 direction inertial force given to the fuel become larger than in the first embodiment.

Figure 10:
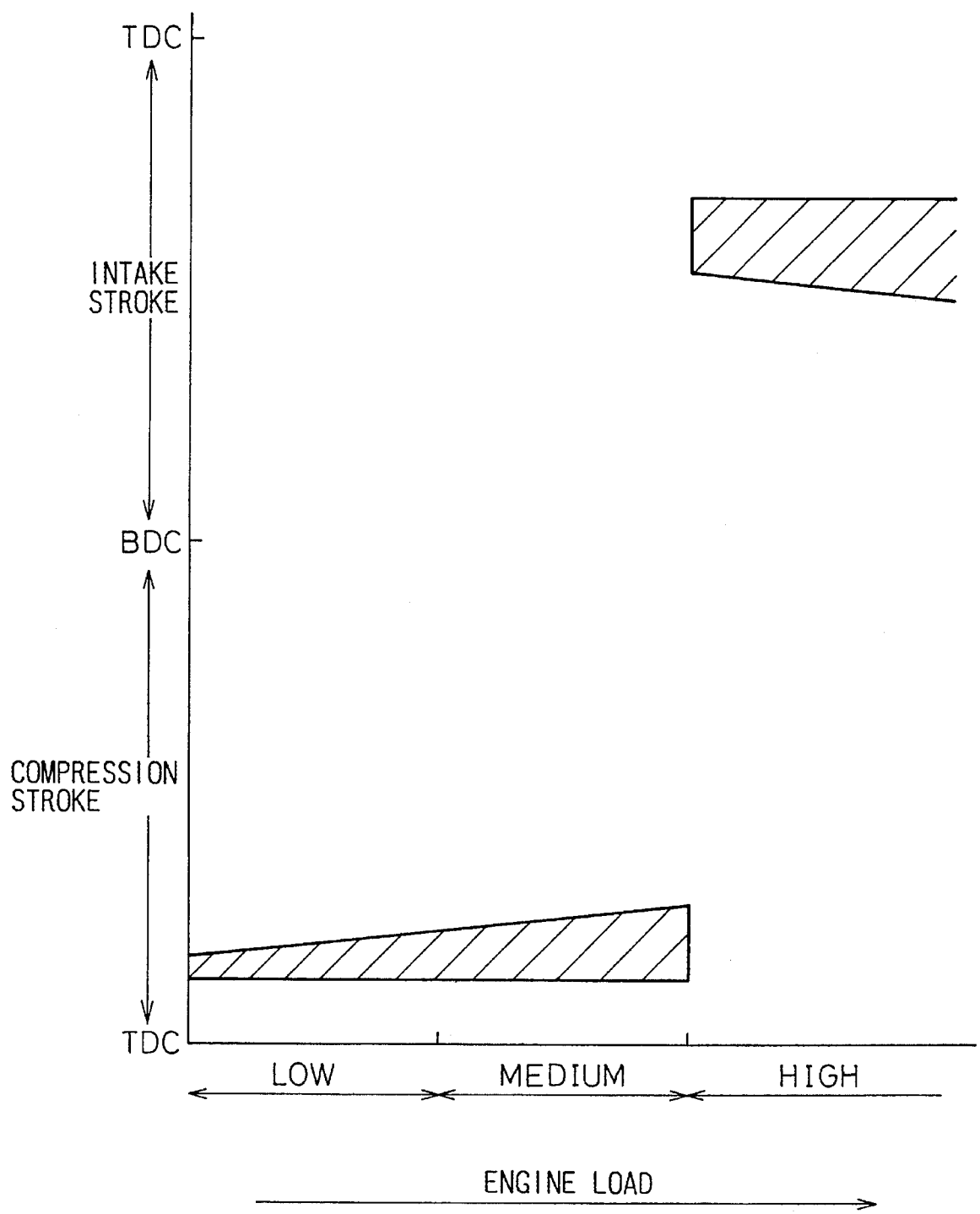
FIG. 10 shows a second map of fuel injection timings under each engine load in the second embodiment.

In the second embodiment of the above engine, the fuel injection timing under each engine load is decided in accordance with a second map as shown in FIG. 10. As seen from the second map, fuel injection, in medium engine load driving condition is carried out only in the latter half of a compression stroke. If such fuel injection is carried out in the first embodiment, a large amount of fuel is supplied to the first and second fuel guide passages so that mixture formed thereon at the ignition timing becomes too rich and thereby black smoke is caused during combustion.

However, the D1 direction inertial force and the D2 direction inertial force given to the fuel are large, as mentioned above, so that a relative large amount of the injected fuel progresses toward the center of the combustion chamber 2 and upward, and is atomized in the cylinder. Therefore, at ignition time, the amount of fuel on the first fuel guide passage 5' is limited adequately. Moreover, the connecting portion between the bottom wall 5'a and the side wall 5'b has a large radius so that the liquid fuel cannot accumulate thereon, and in the vicinity of the tip of the ignition plug 4 at the ignition timing, the amount of fuel progressing in the D1 direction and in the D2 direction becomes larger than in the first embodiment, but the fuel reaches as far as the body of the ignition plug 4 under the influence of the above two strong inertial forces, so that the concentration of the mixture formed in the vicinity of the tip of the ignition plug 4 does not become too rich and becomes the desired value the same as in the low engine load driving conditions of the first embodiment. Therefore, good ignition can be obtained. Next, the flame propagates to the fuel diffused around the body of the ignition plug, so that the good stratified charge combustion can also be realized in the medium engine load driving conditions without black smoke caused by too rich a mixture. Therefore, according to the second embodiment, the division of fuel injection in the medium engine load driving condition is not required so that the fuel injection control can be made simple.

In the second embodiment, when an amount of fuel is relative small in the low engine load driving conditions, the concentration of mixture in the vicinity of the tip of the ignition plug 4 can become more lean than the desired value. However, this problem can be solved by providing a second fuel guide passage 6 or delaying the fuel injection time.

Although the invention has been described with reference to specific embodiments thereof, it should be apparent that numerous modifications can be made thereto by those skilled in the art, without departing from the basic concept and scope of the invention.

We claim:

1. A spark ignition engine with a fuel injector for injecting fuel directly into the cylinder of an engine for producing a good stratified charge combustion, comprising:

a hollow combustion chamber formed on an upper surface of a piston;

an ignition plug inserted into the vicinity of the side wall of said combustion chamber at ignition time by the movement of said piston wherein a tip of the ignition plug includes an ignition portion which protrudes into the combustion chamber at ignition time;

a fuel injector for injecting fuel toward said side wall of said combustion chamber in at least one predetermined engine driving condition; and at least one fuel guide passage for leading fuel injected by said fuel injector into the vicinity of the inserting position in said combustion chamber into which said ignition plug is inserted, wherein the fuel guide passage is defined by a first and a second wall edge and wherein each of the surface of the fuel guide passage, a first phantom surface representing a continuation of the surface of the fuel guide passage beyond the end of the first wall edge and a second phantom surface representing a continuation of the surface of the fuel guide passage beyond the end of the second wall edge are arranged not to cross the ignition portion of the ignition plug regardless of the position of the piston.

2. An engine according to claim 1, wherein said fuel guide passage has a L-shape section which opens toward said combustion chamber and faces the vicinity of the tip of said ignition plug from the transverse side and underside thereof.

3. An engine according to claim 1, wherein a recess is formed on said fuel guide passage underneath the tip of said ignition plug.

4. An engine according to claim 1, wherein another fuel guide passage is formed adjacent to and under said fuel guide passage on said side wall of said combustion chamber.

5. An engine according to claim 2, wherein the side wall and the bottom wall of said fuel guide passage are connected to each other by an arc having a large radius.

6. An engine according to claim 1, wherein said fuel guide passage has an arc-like section which opens toward said combustion chamber.

7. An engine according to claim 1, wherein said fuel guide passage has a U-shaped section which opens toward said combustion chamber.

8. An engine according to claim 1, wherein said fuel guide passage has an inclined shape section.

9. An engine according to claim 1, wherein said predetermined engine driving conditions are low engine load driving conditions.

10. An engine according to claim 5, wherein said predetermined engine driving conditions are low and medium engine load driving conditions.

11. An engine according to claim 5, wherein another fuel guide passage is formed adjacent to and under said fuel guide passage on said side wall of said combustion chamber.

12. An engine according to claim 1, wherein a swirl is created in said combustion chamber, said fuel injector injects fuel in said predetermined engine driving conditions so that said fuel impinges on said fuel guide passage at said swirl upstream portion thereof.

13. An engine according to claim 4, wherein said fuel injector supplies fuel to said fuel guide passage and said another fuel guide passage in said predetermined engine driving conditions.

14. An engine according to claim 11, wherein said fuel injector supplies fuel to said fuel guide passage and said another fuel guide passage in said predetermined engine driving conditions.

* * * * *